(12) United States Patent
Adamucci, Jr.

(10) Patent No.: US 7,735,675 B2
(45) Date of Patent: Jun. 15, 2010

(54) ENVIRONMENTALLY SAFE FLUID WASHOUT CONTAINER

(76) Inventor: Nicholas A. Adamucci, Jr., 2324 Dayton Ave., Atco, NJ (US) 08004

( * ) Notice: Subject to any disclaimer, the term of this patent is extended or adjusted under 35 U.S.C. 154(b) by 418 days.

(21) Appl. No.: 11/880,136

(22) Filed: Jul. 21, 2007

(65) Prior Publication Data

US 2009/0020534 A1 Jan. 22, 2009

(51) Int. Cl.
*B65D 90/24* (2006.01)
(52) U.S. Cl. ............... 220/501; 220/62.18; 220/676
(58) Field of Classification Search .......... 4/507, 4/509, 650, 651, 680, 681, 687; 134/10, 134/60, 104.2, 109, 135, 166 R; 137/256, 137/262, 312, 395, 574, 577, 590.5; 141/36, 141/121, 122, 123; 210/320, 521, 522, 532.1, 210/540; 220/62.18, 501, 505, 506, 553, 220/555, 560.03, 563, 564, 571, 601, 660, 220/661, 676, 729, 731, DIG. 5, DIG. 6, 220/DIG. 28, 921; 232/44; *B65D 90/24*
See application file for complete search history.

(56) References Cited

U.S. PATENT DOCUMENTS 3,195,727 A * 7/1965 Kibbee ............... 210/195.4

4,736,760 A * 4/1988 Coberly et al. ............. 134/134
2005/0178409 A1* 8/2005 Masaki et al. .................. 134/76
2005/0229953 A1* 10/2005 Jenkins ....................... 134/22.1

FOREIGN PATENT DOCUMENTS

GB 2068900 A * 8/1981
GB 2109346 A * 6/1983

* cited by examiner

*Primary Examiner*—Anthony Stashick
*Assistant Examiner*—Brett Edwards
(74) *Attorney, Agent, or Firm*—Stuart M. Goldstein

(57) ABSTRACT

An environmentally safe concrete washout container employs one longitudinally extending side wall unit located on each side of the container. The side wall units assist in defining the space within the container for the collection of concrete waste, including concrete fluid washout material. Each side wall unit has an exterior wall and an interior wall, the walls forming a longitudinally extending open area. The internal walls have slotted openings at their upper and lower ends. Instead of spilling over the edge of the container, concrete fluid washout material which reaches a certain height within the space in the container flows through the upper slotted openings of the internal walls and then down into and through the open areas between the exterior and interior walls of the side wall units. The concrete fluid washout then flows through the lower slotted openings into an enclosed space or cofferdam, where it may be drained or pumped out of the container. In this manner, concrete fluid washout is recirculated back into and then out of the container, rather than being spilled onto the ground.

25 Claims, 5 Drawing Sheets

ENVIRONMENTALLY SAFE FLUID WASHOUT CONTAINER

BACKGROUND OF THE INVENTION

In today's environmentally conscious society, the disposal of all types of potentially harmful waste material is of critical importance. This includes the waste disposal of residual, uncured, concrete material from construction sites. Such concrete material is primarily found in and on the concrete trucks and mixers which are used for the preparation and delivery of concrete to the sites. During the course of their operation, these trucks and mixers become covered with residual concrete which must be removed before it hardens. Removal is normally accomplished by applying high pressure water onto the equipment to wash off the uncured concrete. Harden concrete waste which is removed poses little threat and can easily be disposed of without environmental damage. However, the resultant water/concrete mixture runoff, if left unattended, will seep into the ground and pollute the soil, surrounding groundwater, plants and animals, and generally effect the immediate and adjacent areas.

To address this potential environmental problem, washout waste containers are now commonly used to collect residual concrete waste water and other concrete waste material. An example of such a washout container is shown in U.S. Pat. No. 7,118,633. After concrete trucks and associated tools are treated with high pressure water from appropriate hoses, all residual concrete waste, including excess and uncured concrete, concrete slag and debris, and washout water, are emptied into a washout container. The concrete fluid waste is pumped out and disposed of in an environmentally friendly manner, in accordance with recognized governmental environmental standards. When sufficient solid waste material has been collected, it is dumped out of the container so that it can be crushed for recycling purposes or otherwise disposed of without harm to the environment.

However, as a washout container is filled with concrete waste and concrete fluid washout, there is a very real risk that during the loading of this waste and fluid washout into the container, the washout will overflow the container, spilling onto the ground and causing the very contamination which the use of the container is designed to prevent. There is currently no simple, yet effective means to address this significant, yet very common problem.

SUMMARY OF THE INVENTION

It is thus the object of the present invention to address the limitations and disadvantages of existing concrete fluid and other fluid waste washout containers.

It is an object of the present invention to provide an environmentally safe concrete fluid washout container which easily accepts concrete waste material, including concrete fluid washout, while preventing the risk of washout spillover from the container.

It is still another object of the present invention to provide an environmentally safe concrete washout container which employs overflow spill protection configuration which recirculates concrete fluid washout back into the container, once the waste reaches a certain level within the container.

It is a further object of the present invention to provide an environmentally safe concrete washout container which is easily constructed to address the problem of concrete fluid washout spillover.

It is another object of the present invention to provide an environmentally safe washout container which provides overflow spill protection for all types of fluid waste material.

These and other objects are accomplished by the present invention, an environmentally safe concrete fluid or similar fluid waste washout container which employs one longitudinally extending side wall unit located on each side of the container. The side wall units assist in defining the space within the container for the collection of concrete waste, including concrete fluid washout or similar fluid waste material. Each side wall unit has an exterior wall and an interior wall, the walls forming a longitudinally extending open area. The internal walls have slotted openings at their upper and lower ends. Instead of spilling over the edge of the container, concrete fluid washout material which reaches a certain height within the space in the container flows through the upper slotted openings of the internal walls and then down into and through the open areas between the exterior and interior walls of the side wall units. The concrete fluid washout then flows through the lower slotted openings into an enclosed space or cofferdam, where it may be drained or pumped out of the container. In this manner, concrete fluid washout is recirculated back into and then out of the container, rather than being spilled onto the ground.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
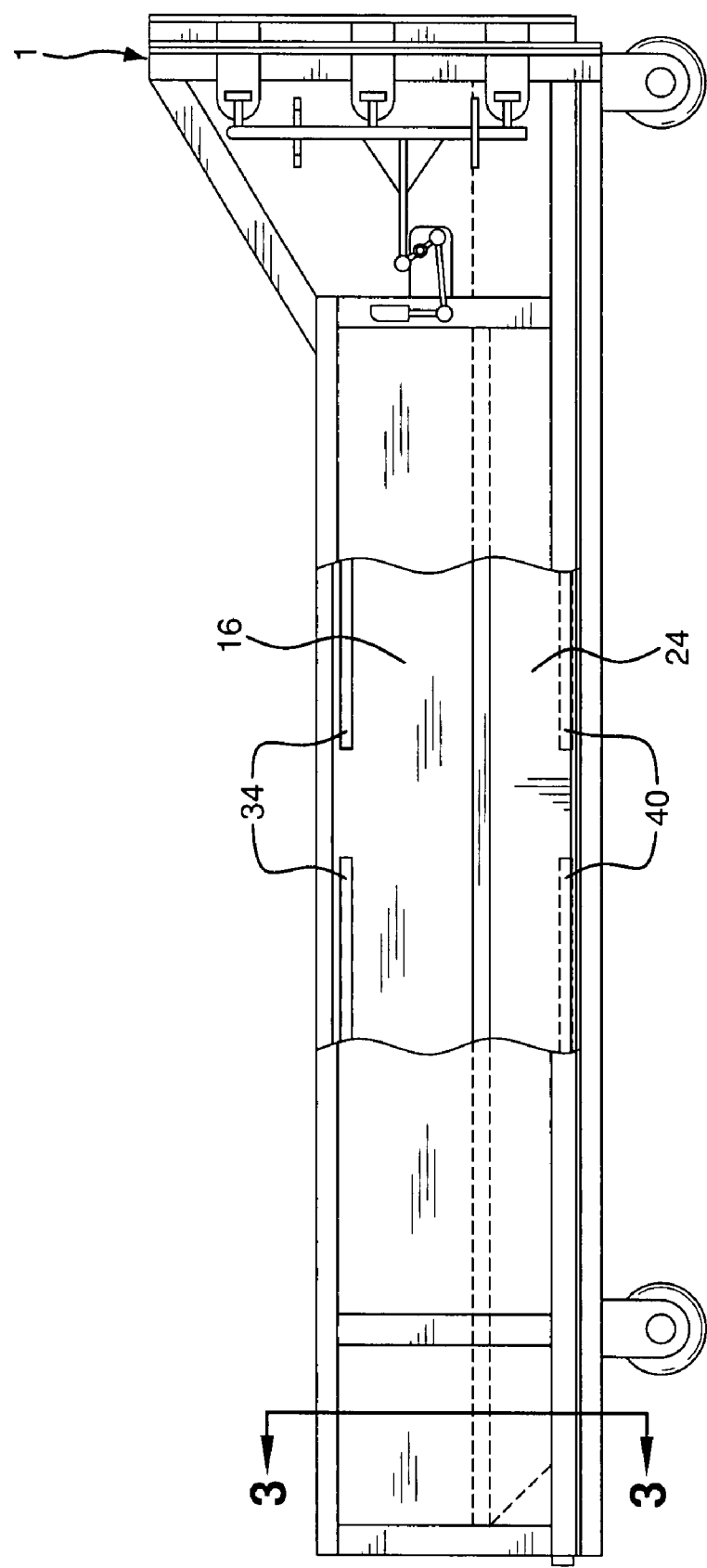
FIG. 1 shows an elevation view, partially broken away, of the environmentally safe concrete washout container of the present invention.

Environmentally safe concrete washout container 1 comprises front wall 2, longitudinally extending side wall units 4 and 6, and back wall 8. At the bottom of container 1 is floor surface 9. Rear wall 8 rises above the other wall members. Internal ramp 17 extends downwardly from front wall 2, as is known in the art.

Side wall unit 4 comprises interior wall 10 and exterior wall 12. Walls 10 and 12 define open area 14 extending longitudinally through one side of container 1. Side wall unit 6 comprises interior wall 16 and exterior wall 18 defining open area 20 extending through the other side of container 1.

Shell plate members 22 and 24 also extend substantially the full longitudinal length of container 1 and are secured by welding or equivalent means at an angle between interior walls 10 and 16 and floor surface 9. Enclosed, watertight spaces or cofferdams 26 and 28 are formed between plate members 22 and 24 and floor surface 9. Space 30 is defined within container 1 by front wall 2, side wall units 4 and 6, plate members 22 and 24, floor surface 9 and back wall 8.

Figure 2:
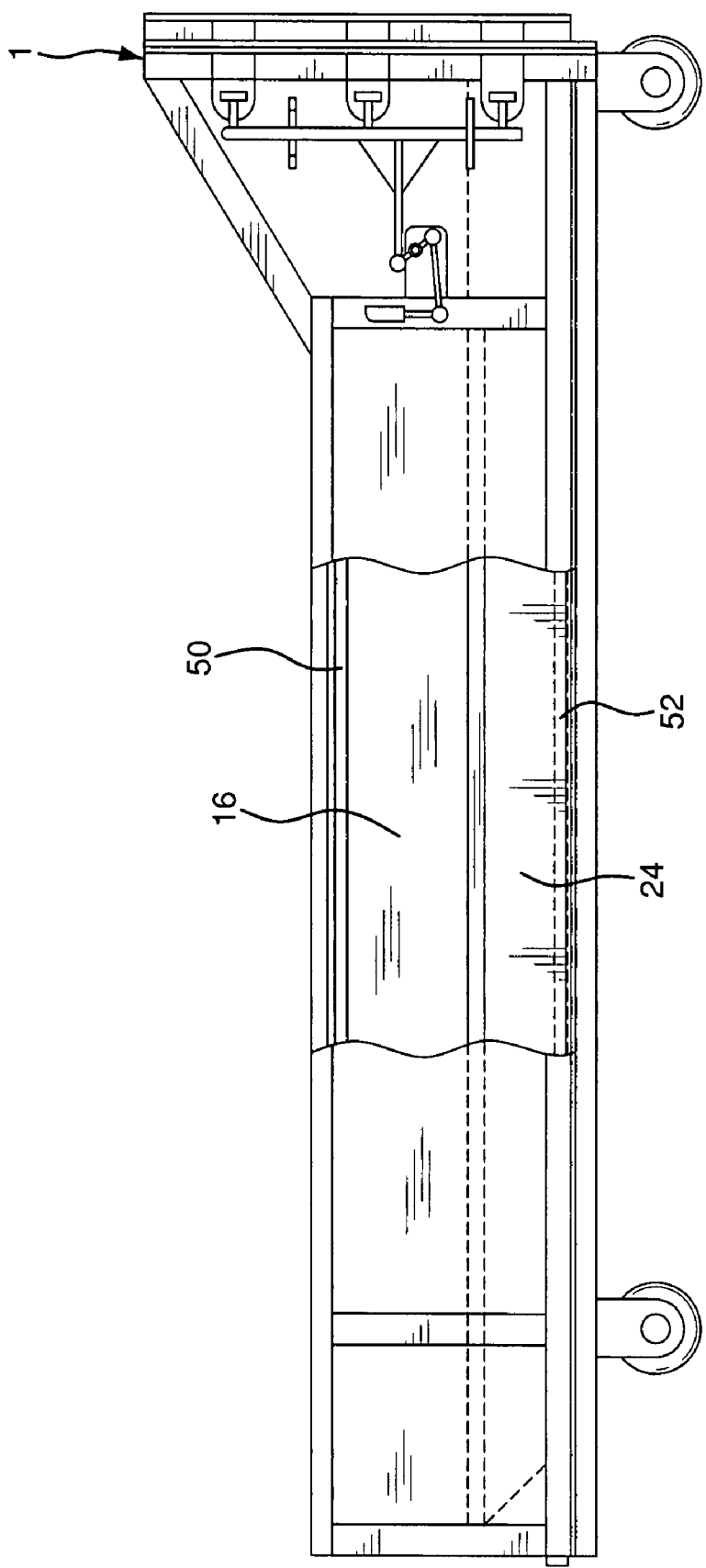
FIG. 2 shows an elevation view, partially broken away, of a second embodiment of the environmentally safe concrete washout container of the present invention.
Figure 3:
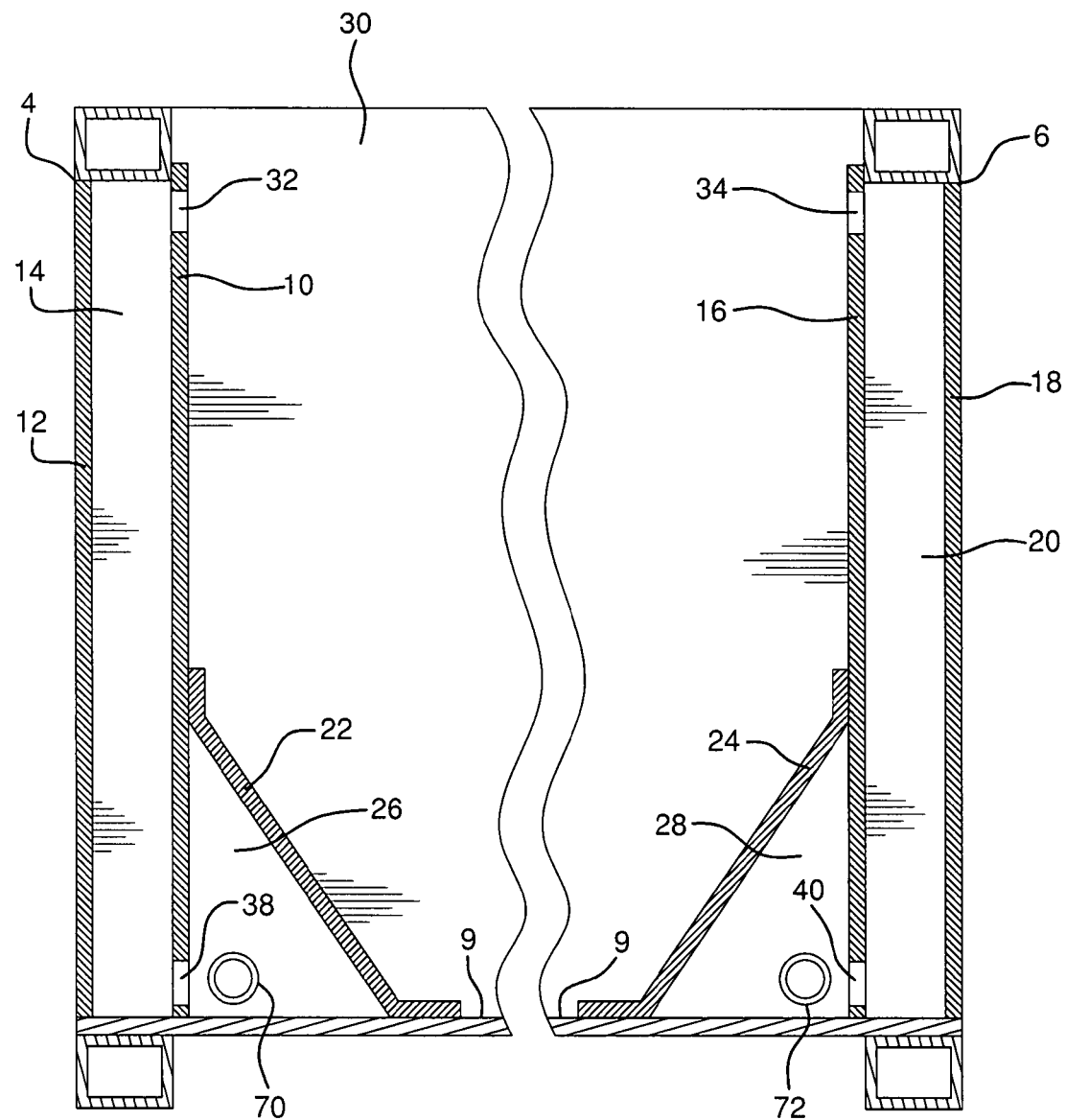
FIG. 3 is a sectional view taken from FIG. 1.
Figure 4:
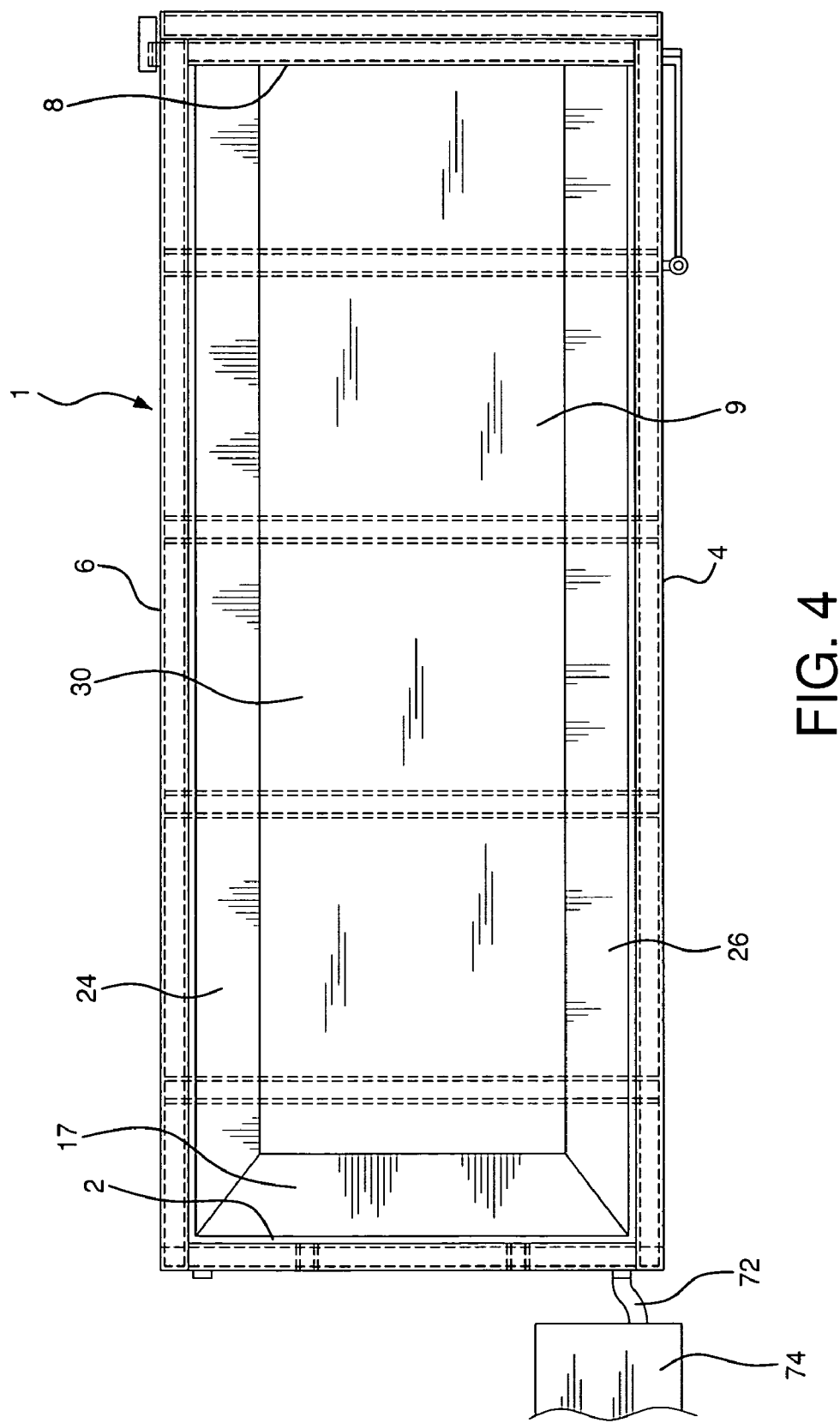
FIG. 4 is a top view of the environmentally safe concrete washout container of the present invention.

Interior walls 10 and 16 of wall units 4 and 6 each comprise two or more slotted openings 32 and 34 respectively, located at the upper regions of the walls and two or more slotted openings 38 and 40 respectively, located at the lower regions of the walls. Alternatively, the upper and lower slotted openings can extend the entire longitudinal length of interior walls 10 and 16. FIG. 2 shows extended upper slotted opening 50 and lower slotted opening 52 in interior wall 16. Interior wall 10 would have similar, longitudinally extending upper and lower slotted openings, for example as noted in FIG. 5.

Figure 5:
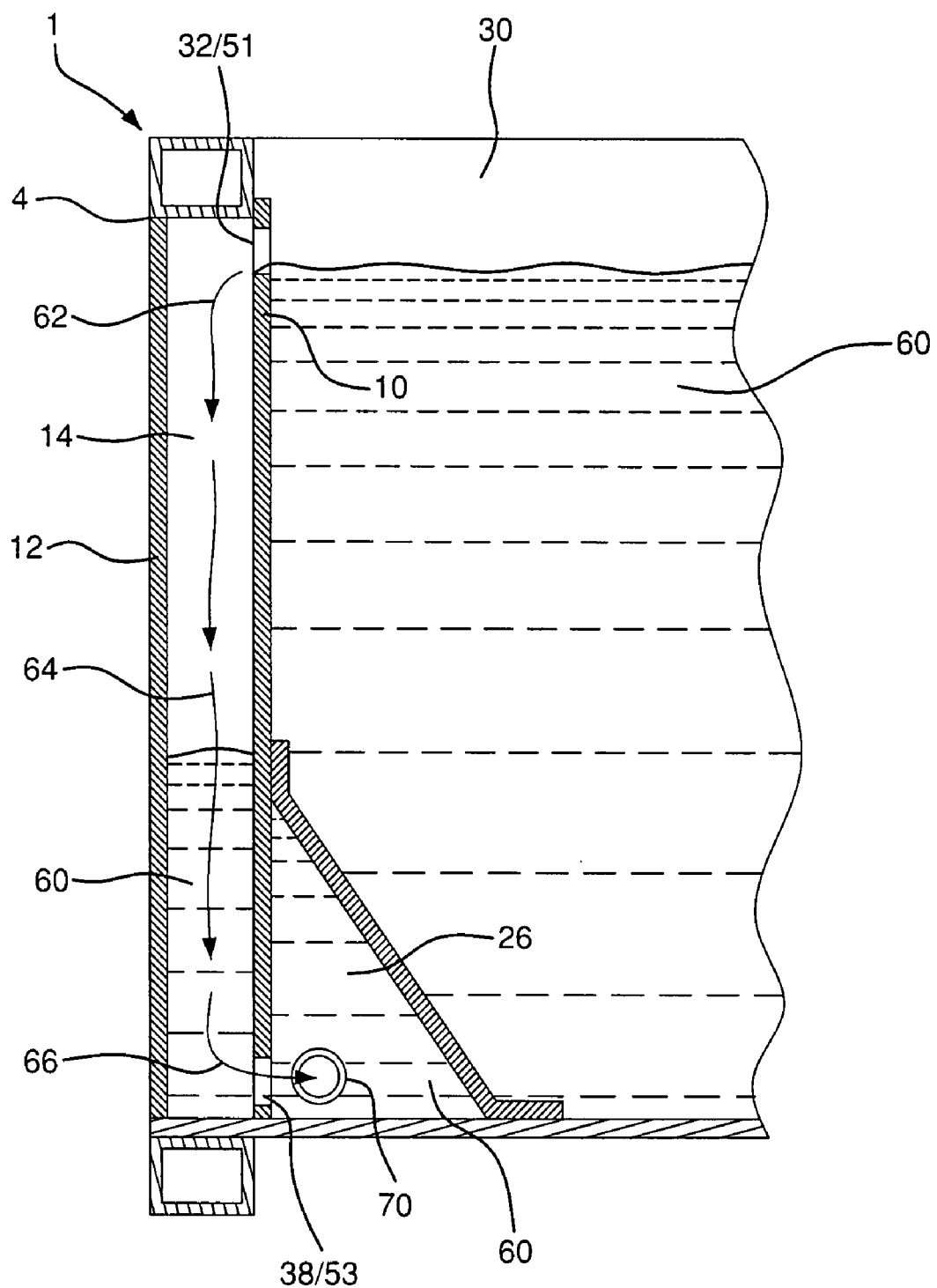
FIG. 5 is a partial sectional view of FIG. 3 showing the operation of the environmentally safe concrete washout container of the present invention.

FIG. 5 is a representation of how washout container 1 operates. With reference only to one side of container 1, concrete waste, including concrete fluid washout material 60, is dumped into container 1 via ramp member 17. This waste is collected within space 30, where the residual concrete material hardens and the fluid concrete washout accumulates. However, as concrete fluid washout 60 is emptied into container 1, the level of the washout rises within space 30.

When concrete fluid washout 60 reaches the level of slotted openings 32 (or single longitudinally extending slotted opening 51) of interior wall 10, rather than flowing out over the sides and front wall 2 of container 1, it flows through the slotted openings 32/51, at designation 62, into open area 14, between interior wall 10 and exterior wall 12, at designation 64, and out lower slotted openings 38 (or single longitudinally extending slotted opening 53), at designation 66, into cofferdam 26. From there, fluid washout 60 is pumped out through drain 70, via hose line 72, to a waste collecting tank or truck 74, where it is recycled or otherwise safely disposed of in an environmentally friendly fashion.

It is understood that overflowing concrete fluid washout material 60 travels a similar path on the other side of container 1, i.e. through slotted openings 34 (or 50) in wall unit 6, into open area 20, through slotted openings 40 (or 52), and into cofferdam 28, where it is pumped out through drain 72.

Thus, it is evident that the unique structural configuration of container 1 will eliminate spillover of concrete fluid washout material and, instead, cause it to be recirculated back to the container for ultimate disposal out of the container, thus avoiding fluid overflow and seepage of contaminated material into the ground.

Although discussion herein generally refers to concrete waste and concrete fluid washout material, the use of the washout container so described is not to be considered restrictive to concrete fluid waste material, but can also readily be used to control overflow of other mixtures of liquid waste material and fluid contaminates. The scope of the invention is related to a environmentally friendly means of generally addressing overflow of all types of fluid waste material and removing same from washout type containers.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An environmentally safe concrete fluid waste material washout container having an open top, said container comprising a floor, a front wall, a back wall, a first side wall and a second side wall, said floor, said front wall, said back wall, said first side wall and said second side wall together defining a partially enclosed space for receiving concrete fluid waste material, means to introduce a downward flow of concrete fluid waste material directly from the open top of the container into the space, said floor having an uninterrupted, unbroken surface which extends for substantially an entire length of the container, at least one of the side walls comprising a pair of wall members, each of said wall members having a longitudinal length, a lower end near the floor, and an upper end, said pair of wall members forming a longitudinally extending open area therebetween, opening means extending through one of the wall members to provide access between the space and the open area, whereby concrete fluid waste material entering the opening means flows downwardly into the open area, and second opening means extending through said one of the wall members near the floor of the container to permit concrete fluid waste material to flow out of the open area for ultimate removal from the container.

2. The container as in claim 1 wherein said one of the wall members comprises an interior wall of the container and the other wall member comprises an exterior wall of the container.

3. The container as in claim 2 wherein the opening means comprises at least one slotted opening at the upper end of the interior wall.

4. The container as in claim 3 wherein the slotted opening extends substantially the entire length of the interior wall.

5. The container as in claim 1 wherein said one of the wall members comprises an interior wall and the other wall member comprises an exterior wall and the second opening means extends through the lower end of the interior wall.

6. The container as in claim 5 wherein the second opening means comprises at least one slotted opening at the lower end of the interior wall.

7. The container as in claim 6 wherein the slotted opening at the lower end of the interior wall extends substantially the entire length of the interior wall.

8. The container as in claim 5 further comprising a cofferdam for recovering concrete fluid waste material from the second opening means.

9. The container as in claim 1 wherein said second side wall comprises a second pair of wall members forming a second longitudinally extending open area therebetween.

10. The container as in claim 9 wherein said second pair of wall members comprises an interior wall of the container and an exterior wall of the container and at least one slotted opening at the upper end of the interior wall.

11. The container as in claim 10 further comprising at least one slotted opening at the lower end of the interior wall of the second pair of wall members.

12. The container as in claim 1 further comprising two cofferdams located on opposite sides of the container for recovering concrete fluid waste material from the second opening means.

13. The container as in claim 1 further comprising means for draining the concrete fluid waste material from the container.

14. An environmentally safe concrete fluid waste material washout container having an open top, said container comprising a floor, a front wall, a back wall, a first longitudinally extending side wall unit and a second longitudinally extending side wall unit, said floor, said front wall, said back wall, said first side wall and said second side wall together defining a partially enclosed space for receiving concrete fluid waste material, means to introduce a downward flow of concrete fluid waste material directly from the open top of the container into the space, said floor having an uninterrupted, unbroken surface which extends for substantially a length of the container, at least one of the side wall units comprising an interior wall with a lower end near the floor and an upper end and an exterior wall with a lower end near the floor and an upper end, said interior and exterior walls forming a longitudinally extending open area therebetween, opening means extending through the interior wall to provide access between the space and the open area, whereby concrete fluid waste material entering the opening means flows downwardly into the open area, and second opening means extending through the interior wall to permit concrete fluid waste material to flow out of the open area for ultimate removal from the container.

15. The container as in claim 14 wherein the opening means comprises at least one slotted opening at the upper end of the interior wall.

16. The container as in claim 15 wherein the slotted opening extends substantially the entire length of the interior wall.

17. The container as in claim 14 wherein the second opening means comprises at least one slotted opening at the lower end of the interior wall.

18. The container as in claim 17 wherein the slotted opening of the second opening means extends substantially the entire length of the interior wall.

19. The container as in claim 14 further comprising a cofferdam for recovering concrete fluid waste material from the second opening means.

20. The container as in claim 14 wherein said second side wall unit comprises an interior wall and an exterior wall forming a second longitudinally extending open area therebetween.

21. The container as in claim 20 further comprising opening means extending through the interior wall of the second side wall unit.

22. The container as in claim 21 further comprising a second opening means extending through the interior wall of the second side wall unit and between the space and the second open area to permit waste material to flow out of the open area.

23. The container as in claim 22 wherein the second opening means through the interior wall of the second wall unit comprises at least one slotted opening at the lower end of the interior wall.

24. The container as in claim 22 comprising two cofferdams located at opposite sides of the container for recovering concrete fluid waste material from the second opening means of the interior walls of the side wall units.

25. The container as in claim 14 further comprising means for draining the waste material from the container.

* * * * *